United States Patent [19]

Sebzda, Sr.

[11] Patent Number: 4,922,074
[45] Date of Patent: May 1, 1990

[54] V-BLOCK HOLDER FOR EDM ELECTRODE

[76] Inventor: Jack Sebzda, Sr., 7 Schuyler Ave., Pequannock, N.J. 07440

[21] Appl. No.: 189,844

[22] Filed: May 3, 1988

[51] Int. Cl.⁵ .............................................. B23P 1/08
[52] U.S. Cl. .............................. 219/69.15; 219/69.11; 269/155; 204/286; 204/297 R
[58] Field of Search ................. 219/69 M, 138, 69.11, 219/69.15; 269/137, 134, 155; 204/286, 297 R

[56] References Cited

U.S. PATENT DOCUMENTS

| | | | |
|---|---|---|---|
| 2,449,459 | 9/1948 | Eckert | 51/217 |
| 2,472,040 | 5/1949 | Brookfield | 29/96 |
| 3,094,821 | 6/1963 | Eckert | 51/317 |
| 3,323,809 | 6/1967 | Brookfield | 279/6 |
| 3,474,215 | 10/1969 | Johanson | 219/69 |
| 3,484,115 | 12/1969 | Meyer | 279/6 |
| 4,013,862 | 3/1977 | O'Connor | 219/69 E |
| 4,151,984 | 5/1979 | Zapart | 269/9 |
| 4,234,276 | 11/1980 | Meier, Jr. | 408/104 |
| 4,454,689 | 6/1984 | Giebmanns | 51/217 R |
| 4,562,632 | 1/1986 | Parchet et al. | 29/28.1 |
| 4,583,432 | 4/1986 | Bricker | 82/1 C |
| 4,621,821 | 11/1986 | Schneider | 279/83 |
| 4,655,654 | 4/1987 | Portas | 409/220 |
| 4,713,515 | 12/1987 | Choi | 219/69 E |

Primary Examiner—M. H. Paschall
Attorney, Agent, or Firm—Fleit, Jacobson, Cohn, Price, Holman & Stern

[57] ABSTRACT

A V-block accurately and predictably aligns an electrode blank with respect to an electrode holder. The V-block is clamped against two locating flats that are machined perpendicular to each other and perpendicular to an end face of a standard 20 mm diam. electrode holder. A clamping ring locks the V-block against the machined flats of the electrode holder. The location of the machined flats with respect to the center of the electrode holder shaft is based upon the size of the electrode which will be automatically centered on the electrode holder.

20 Claims, 8 Drawing Sheets

V-BLOCK HOLDER FOR EDM ELECTRODE

BACKGROUND OF THE INVENTION

Electrical discharge machining (EDM) is a process by which an electrically conductive metallic workpiece can be machined by selective removal of the metallic workpiece material through an electrical spark discharged from an electrode. This process is used to form a variety of complex shapes in materials that would otherwise be difficult to obtain by drilling, milling, grinding, or other conventional cutting techniques.

An electrode blank, from which an electrode may be formed, can be fixed in position on an electrode holder in a variety of ways. Some of the more common methods used are to solder the electrode blank on the electrode holder, use of a press fit and glue joint for holding an electrode blank on an electrode holder, or screwing an electrode blank onto an electrode holder with a glue joint. The electrode blank may then be machined into an electrode of a particular configuration for use in an EDM process. The electrode holders, with the electrodes mounted thereon, are then mounted in an EDM machine for carrying out an EDM process.

In some instances, a series of electrode holders, for example, up to 16 electrode holders, may be mounted in a 3R-SP50223 Robomatic 16 VS Automatic Electrode Changer, available from System 3R U.S.A., Inc., Cedar Grove, New Jersey. A plurality of specifically configured electrodes are mounted on these electrode holders, which are then mounted in the EDM machine and successively applied to a workpiece to produce a specifically configured end product. It is imperative that the electrode holder and the electrode be accurately positioned along all three reference planes, x, y, and z, to accurately machine a product to a desired configuration.

In some instances, it is not practical to configure an electrode from an electrode blank that is first mounted on an individual electrode holder because the number of electrode holders required is cost prohibitive. Small- to medium-size, square, or rectangular electrodes are sometimes used in large quantities, and it is more cost efficient to purchase precision-ground graphite electrode blanks. The required detail is then machined on the working end of the graphite blank, while the blank is held in a grinding vice or V-block. The finished electrode is then transferred to a similar V-block mounted on the ram or quill of an EDM machine.

This process, while convenient, presents problems in predicting the accurate location of each electrode in reference to the electrode holder and thereby to the workpiece. Usually, the only method of locating the position of the electrode is by use of an electrical edge finder. These edge finders have proven to be unreliable and useful only when broad tolerances are acceptable. Aligning a flushing hole through the center of the electrode with the flushing hole extending through the center of the electrode holder also becomes complicated by the present practices and, in many instances, often proves impossible.

In U.S. Pat. No. 4,583,432 to Bricker, a supercentering electrode holder is described, which supercenters an electrode relative to a concentrically rotatable cylinder. A clamping subassembly is centerable with respect to a centering member. The centering member has a centering projection, which is supercenterable with respect to a holder by several axially normal adjustment screws engaging side surfaces of the centering projection. The cylinder is slowly rotated, thereby rotating the tooling and the clamped electrode. The eccentricity of rotation is thereby determined, and appropriate, incremental adjustments are made using the adjustment screws. This process is repeated until no more adjustments are needed to remove the eccentricity of rotation.

In U.S. Pat. Nos. 2,472,040 and 3,323,809 to Brookfield, a work holder with a V-block is disclosed for clamping an electrode. Adjustment of the electrode is achieved by releasing set screws, moving the work holder, and resetting the set screws. Repeated adjustments are made until the workpiece is centered.

In the patents to Brookfield and Bricker, a series of tightening and loosening adjustments must be made in order to adjust a clamping assembly with respect to a cylindrical electrode holder. These series of adjustments are time-consuming and fail to ensure an immediate supercentering of an electrode which is accurate with respect to a work holder.

Further examples of clamping subassemblies which initially clamp an electrode in a tool followed by several adjustments to position the electrode relative to the tool holder are found in U.S. Pat. Nos. 3,094,821 and 2,449,459 to Eckert, U.S. Pat. No. 3,474,215 to Johanson, and U.S. Pat. No. 4,655,654 to Portas.

In the present invention, the problems of the prior art are overcome by the immediate and automatic supercentering of an electrode with respect to an electrode holder having machined flats extending perpendicular to each other and perpendicular to an electrode holder end face.

SUMMARY OF THE PRESENT INVENTION

By the present invention, a novel V-block assembly is provided to accurately and predictably align an electrode with respect to an electrode holder. In the present invention, a precision V-block is clamped against two locating flats that are machined perpendicular to each other and perpendicular to an end face of a standard 20 mm diameter electrode holder. A clamping ring locks the V-block against the machined flats of the electrode holder. The location of the machined flats with respect to the center of the electrode holder shaft is based upon the size of the electrode that will thereby be automatically centered on the electrode holder.

When the V-block is clamped against the machined flats, the V-block creates a perfectly square nest for an electrode blank. A second clamping ring is used to secure the electrode, or electrode blank, in place on the V-block and to the end face of the electrode holder. By using the V-block of the invention, a minimum of raw material of the electrode blank is wasted for holding and accurately locating the electrode with respect to the electrode holder.

The end face of the electrode holder provides the "z" reference, while the two machined flats provide the "x" and "y" references. The electrode holder shaft includes a crosspin for "c" axis location. This crosspin provides a method of four-way indexing, which is accurately transferred to the electrode blank by the V-block.

For center flushing of the electrode through the electrode holder, it is a simple matter to drill through the unhardened electrode mounting end of the electrode holder to connect a flushing hole of the electrode blank with that of the electrode holder.

To determine the correct positioning of the machined flats with respect to the center of the electrode holder, the machined flats are ground from the center of the electrode holder at a location spaced a distance of one-half of the electrode cross-sectional width and height to accurately position the center of the electrode blank on the electrode holder. Round electrodes can also be clamped and centered in the V-block of the invention, with convenient center flushing by grinding two perpendicular flats at a distance of one-half the diameter of the electrode from the center of the electrode holder. Seals for the flushing liquid are not usually necessary if the end of the electrode is smoothly machined, and the end of the shaft is ground square.

The V-block of the invention serves to mount graphite electrode blanks to the end of an electrode holder without the use of screws or glue. By the installation of a new electrode blank on the electrode holder, the electrode holders can be reused with no additional processing after an electrode is worn.

It is an object of the present invention to provide a V-block for supercentering an electrode blank on an electrode holder.

It is a further object of the present invention to grind two perpendicular flats onto an electrode holder for aligning a V-block to form a nest for receipt of an electrode blank.

It is yet another object of the present invention to clamp a V-block onto an electrode holder having two perpendicular machined flats and to clamp an electrode blank into the V-block to supercenter the electrode blank with respect to the electrode holder.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
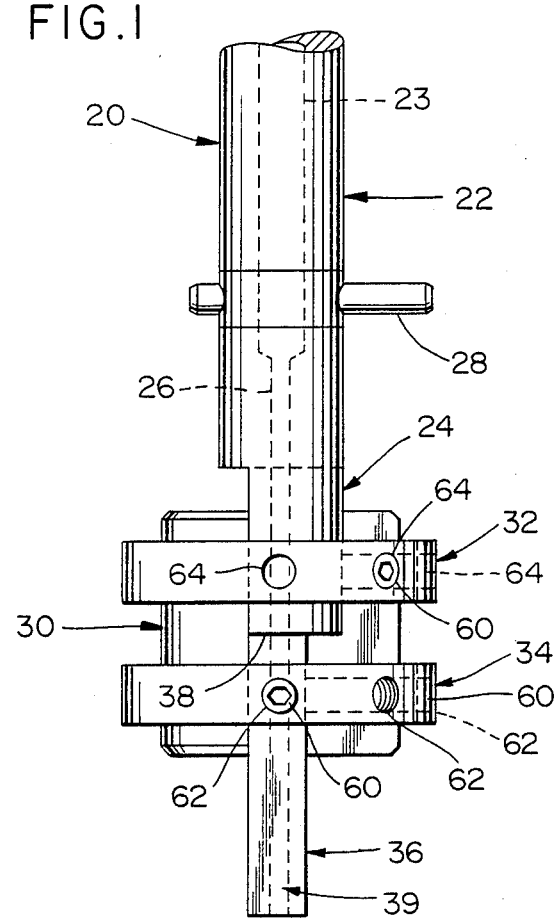
FIG. 1 is a side view of a V-block clamped onto an electrode holder and an electrode blank clamped in the V-block.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In FIG. 1, a typical electrode holder 20 is shown. This electrode holder is available from System 3R U.S.A., Inc., Cedar Grove, New Jersey, as Model No. 3R-322/50. The electrode holder 20 includes a hardened end 22, which is provided with a flushing hole 23 of approximately 5/16-inch diameter for supply of flushing liquid through the electrode holder. The end 22 is for mounting in an EDM machine. The other end 24 is unhardened for a length of 50 mm. A flushing hole 26 may be drilled through the end 24 before securing an electrode to the end face 38. An electrode blank is mounted on the end face may have a flushing hole drilled through its center by securing the electrode blank in the clamping assembly of the invention and drilling halfway through the electrode blank. The electrode blank is then released and reversed, and the remaining half of the electrode blank flushing hole is then drilled. In the clamping assembly shown in FIG. 1, a flushing hole 39 has been drilled through the electrode 36. A crosspin 28 extends through the electrode holder and projects from the electrode holder for "z" and "c" axis location.

A V-block 30 is clamped onto the electrode holder, machined in accordance with the present invention, as will be described, by a clamping ring 32. An electrode 36 is secured into the V-block 30 by a clamping ring 34. The clamping ring 34 is identical to clamping ring 32, having three holes for receipt of set screws and a fourth hole for a single dog-point set screw.

Figure 3:
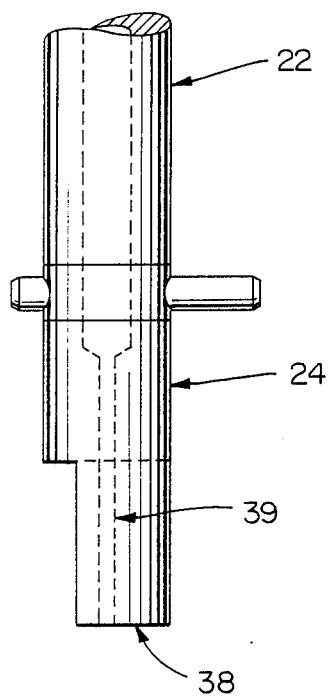
FIG. 3 is a side view of an electrode holder having machined flats.
Figure 4:
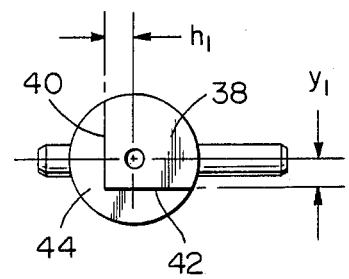
FIG. 4 is a bottom view of the electrode holder shown in FIG. 3 having machined flats.

In FIGS. 3 and 4, the electrode holder end 24 is shown having two ground flats 40 and 42, which extend perpendicular to each other and perpendicular to end face 38. Flats 40 and 42 are machined away from end 24 of the electrode holder. The flats 40 and 42 are each spaced from a center of the electrode holder at a distance $h_1$ for flat 40, which is equal to one-half the cross-section or width of the electrode blank to be affixed to the electrode holder. The distance $h_1$ varies for different size electrodes and, in FIG. 4, is shown for use with a symmetrical square or circular electrode. Distance $y_1$ is half the other dimension or height of the electrode to be held on the electrode holder so that flat 42 is positioned half of the other dimension of the electrode from its center to supercenter the electrode on the end face of the electrode holder.

It is contemplated as being within the scope of the invention that the electrode blank may be of a circular or rectangular configuration. Appropriate spacing of the machined flats from the center of the electrode holder is provided so as to align the center of the electrode with the centers of the electrode holder. The alignment of the centers of the electrode blank and electrode holder is maintained by V-block 30, as will be described, for supercentering of the electrode with respect to the electrode holder.

The machined flats are ground away from the end 24 of the electrode holder for an axial length of approximately 1 inch so as to leave a stepped ledge 44 spaced axially from the end face 38 of the electrode holder. One of the two ground flats is aligned parallel, and the other of the ground flats is aligned perpendicular to a longitudinal axis of cross-pin 28 to provide "c" axis alignment of the electrode blank when the crosspin 28 is positioned against an alignment device.

Figure 5:
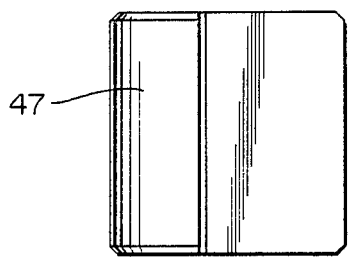
FIG. 5 is a side view of a V-block.
Figure 6:
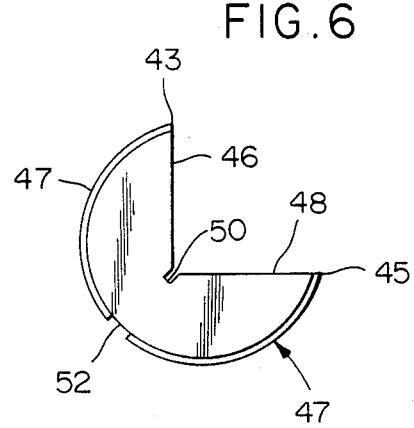
FIG. 6 is a top view of the V-block shown in FIG. 5.

The V-block 30 shown in FIGS. 5 and 6 is made of hardened tool steel. V-block 30 includes a cylindrical exterior surface 47, which terminates at points 43 and 45. Two flat perpendicular surfaces 46 and 48 extend along the entire height of the V-block. A recess 50 allows for clearance of a sharp corner of the electrode. In the V-block shown, there is a recess 52 for receiving a dog-point set screw 53.

Figure 2:
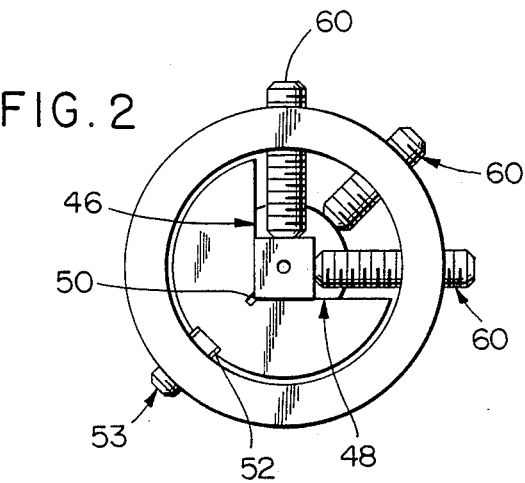
FIG. 2 is a bottom view of the electrode blank, electrode holder, V-block, and clamping ring shown in FIG. 1.

As shown in FIGS. 1 and 2, clamping rings 32 and 34 are secured to V-block 30 by, dog-point set screws 53 passing through clamping rings 32 and 34 and engaging V-block 30 within dog-point set screw recess 52.

Two set screws 60 pass through opening 62 of clamping ring 34 and engage electrode 36 on perpendicularly aligned sides. A third set screw opening 62 is located centrally between the two openings 62 which have set screws 60. This central opening (not show) is used to secure a circular electrode in V-block 30 by a set screw extending through central set screw opening 62 of clamping ring 34.

Clamping ring 32 shows a single opening 64 with a set screw 60 passing therethrough. This secures the V-block to the electrode holder. Clamping ring 32 includes two additional set screw openings 64 for set screws 60 as does clamping ring 34.

The flats machined on the electrode holder must be machined very exactly and must end at a specific distance from the center of the electrode. The V-block is tightly secured against the machined flats of the electrode holder. A nest is thereby formed for the electrode blank by the V-block, which supercenters an electrode blank with respect to the electrode holder.

Figure 7:
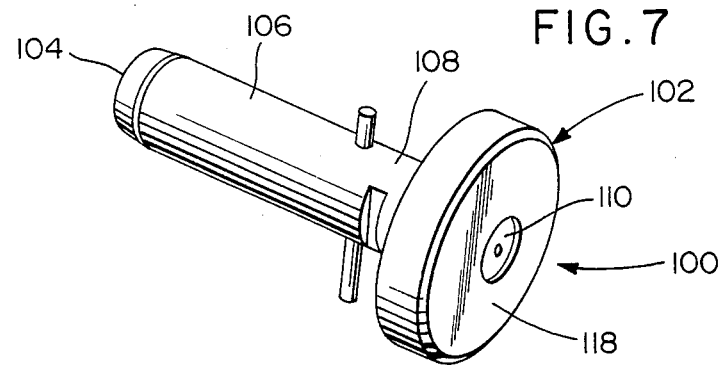
FIG. 7 is a perspective view of another electrode holder.

In FIG. 7, an electrode holder 100 is shown, as is available from System 3R U.S.A., Cedar Grove, New Jersey, as Model No. 3R-310. This electrode holder includes a 50 mm diameter unhardened mounting flange 102 for large electrodes or fixtures. As in the electrode holder shown in FIGS. 1 and 13, a flushing hole 104 is provided which extends through the hardened end 106 of the electrode holder. A flushing hole 108 is drilled through the unhardened end, which includes the flange 102. A recess 110 is provided in the center of flange 102 that is of a very slight depth for accommodating an O-ring for sealing against a mounted electrode blank.

Figure 8:
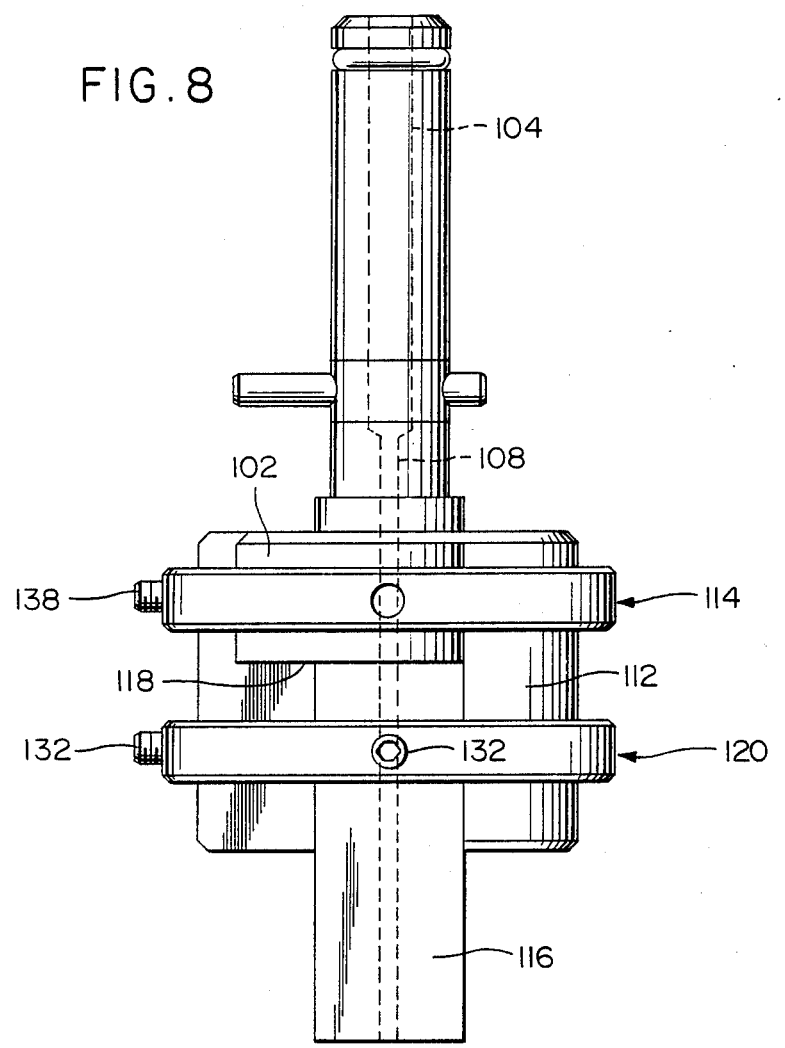
FIG. 8 illustrates an electrode blank clamped to a V-block, which is secured to an electrode holder having machined flats.

In FIG. 8, V-block 112 is shown secured to mounting flange 102 by clamping ring 114, and electrode blank 116 is shown mounted to the end face 118 of the mounting flange 102 by clamping ring 120.

Figure 9:
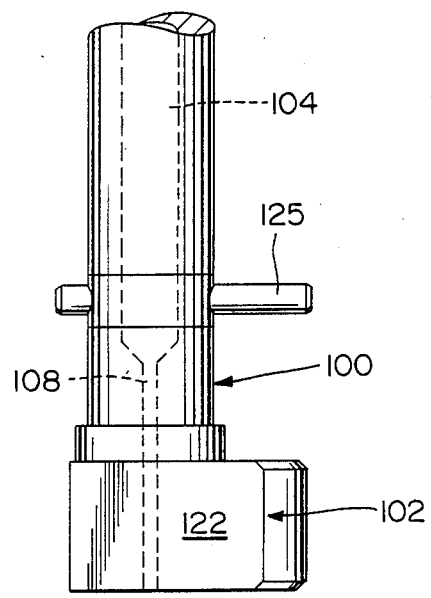
FIG. 9 is a side view of an electrode holder, as shown in FIG. 7, with machined flats.
Figure 10:
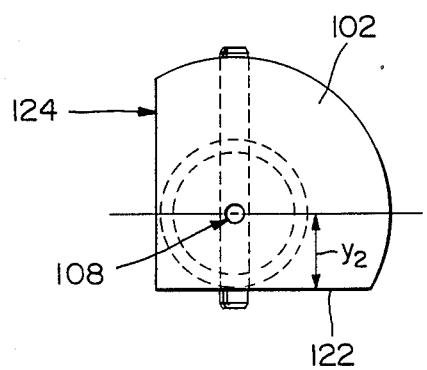
FIG. 10 is a bottom view of the electrode holder shown in FIG. 9.

In FIGS. 9 and 10, the mounting flange 102 is shown including machined flats 122 and 124, which extend perpendicular to each other, with flat 122 spaced a distance $y_2$ from the center of the electrode holder by a distance half of the widthwise dimension of the electrode blank. The flat 124 is spaced a distance half of the lengthwise dimension of the electrode blank. Flat 124 is aligned parallel to a longitudinal axis of c-axis crosspin 125, whereas flat 122 is aligned perpendicular to the longitudinal axis of crosspin 125.

Figure 11:
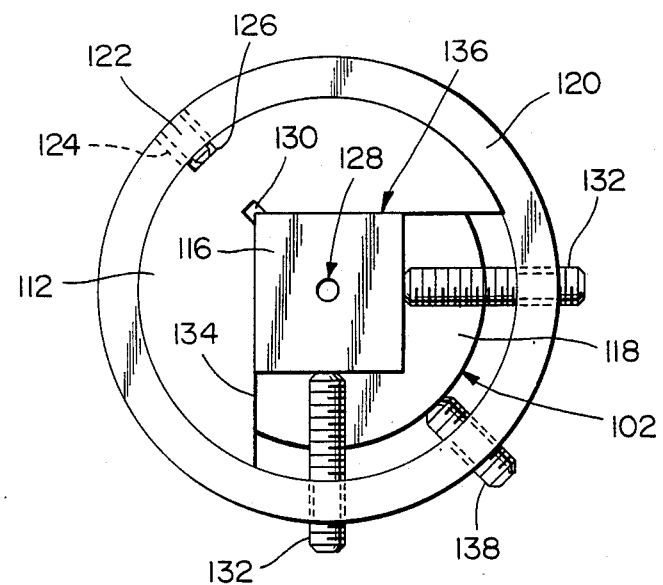
FIG. 11 is a bottom view of the electrode blank, V-block, and electrode holder shown in FIG. 8.
Figure 12:
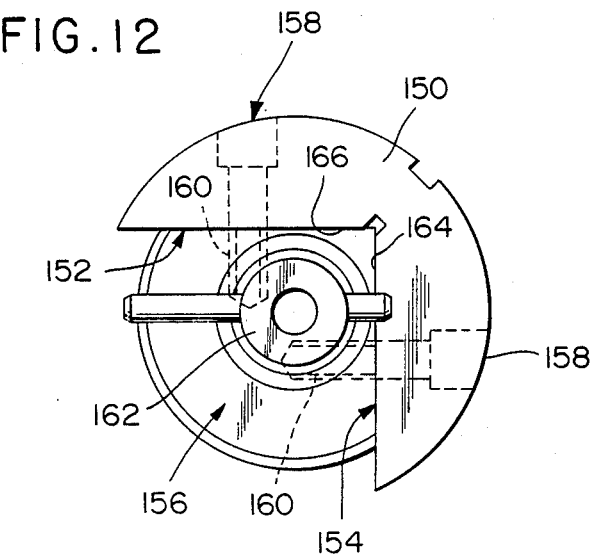
FIG. 12 illustrates an alternate method of holding a V-block onto an electrode holder.

In FIG. 11, clamping ring 120 is shown secured to V-block 112 by a dog-point set screw 122 extending through a threaded opening 124 of clamping ring 120. Clamping ring 120 is identical to clamping ring 114. Dog-point set screws secure clamping rings 120 and 114 to groove 126 in the V-block provided for this purpose. Two set screws 132 extend through clamping ring 120 to secure the electrode blank against the sides 134 and 136 of the V-block, which are formed perpendicular to each other. Flushing hole 128 is drilled through the electrode blank 116 and is aligned with flushing hole 108, which is drilled through the electrode holder. V-block 112 includes a notch 130 for clearance of a sharp corner of an electrode provided between flats 122 and 124.

By locating the surfaces 134 and 136 of the V-block against the ground flats 122, 124 of the mounting flange and securing the V-block to the electrode holder, the electrode blank 116 may be located in the nest formed by side surfaces 134, 136. The V-block thereby automatically supercenters the electrode blank with respect to the electrode holder by tightening of the set screws 132 to clamp the V-block to the electrode holder and the electrode blank.

In an alternate embodiment, V-block 150 is clamped onto the machined flats 152, 154 of a mounting flange 156. Two openings 158 extend through the V-block and align with two threaded openings 160 in the electrode holder 162 for securing two cap screws through the V-block and into the electrode holder. This is a more permanent method of mounting the V-block onto an electrode holder when a large series of electrodes all having the same dimensions, such as a 1-inch square cross-section electrode blank, is repeatedly used. This eliminates one of the V-block clamping rings, with only one ring being required to clamp the electrode blank onto the end face of the mounting flange and against the perpendicular surfaces 164, 166 of the V-block.

Figure 13:
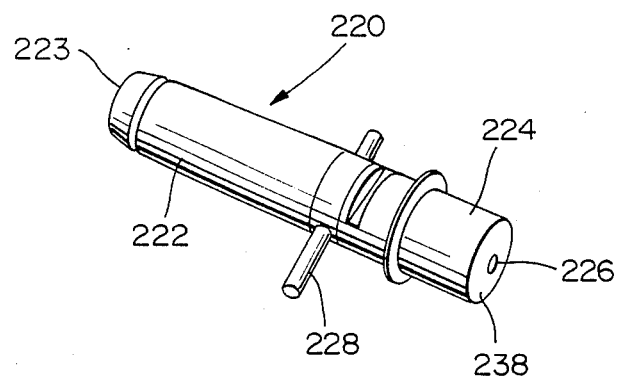
FIG. 13 is a perspective view of an electrode holder.

In FIG. 13, a typical electrode holder 220 is shown. This electrode holder is available from System 3R U.S.A., Inc., Cedar Grove, New Jersey, as Model No. 3R-322/50. The electrode holder 220 includes a hardened end 222, which is provided with a flushing hole 223 of approximately 5/16-inch diameter for supply of flushing liquid through the electrode holder. The end 222 is mounted in an EDM machine. The other end 224 is unhardened for a length of 50 mm. A flushing hole 226 may be drilled through the end 224 before securing an electrode to the end face 238. A crosspin 228 extends through the electrode holder and projects from the electrode holder for orienting the electrode holder along a "c" axis.

Figure 14:
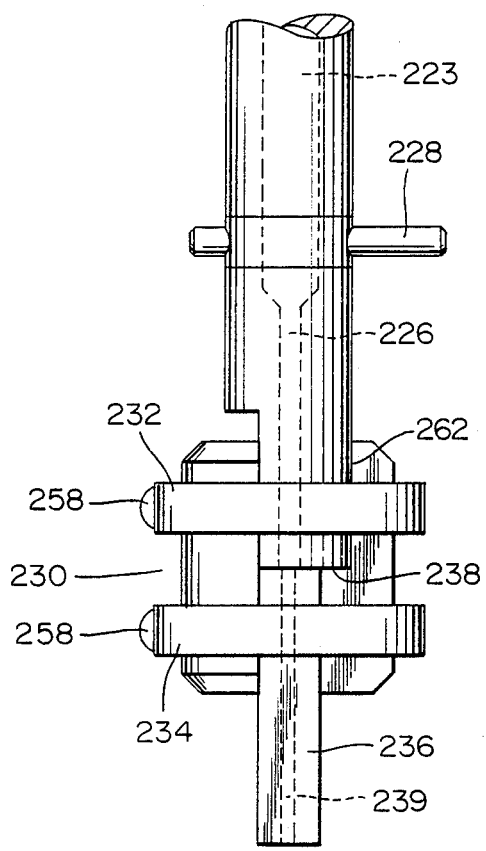
FIG. 14 is a side view of a V-block clamped onto an electrode holder and an electrode blank clamped in the V-block.

As shown in FIG. 14, a V-block 230 is clamped onto the electrode holder, machined in accordance with the present invention, as will be described, by a clamping ring 232. An electrode 236 is secured into the V-block 230 and flush against the end surface 238 of the electrode holder by a clamping ring 234. The clamping ring 234 is identical to clamping ring 232.

In the clamping assembly shown in FIG. 14, a flushing hole 239 may be drilled through the electrode 236. Flushing hole 239 is shown to have a different diameter than the flushing hole 226 drilled through the end 224 of the electrode holder 220. Obviously, if the flushing holes 239 and 226 are drilled at the same time, the diameters will be equal.

Figure 15:
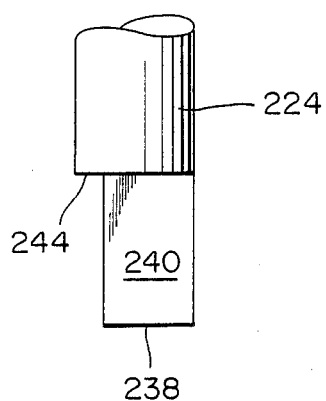
FIG. 15 is a side view of an electrode holder having machined flats.
Figure 16:
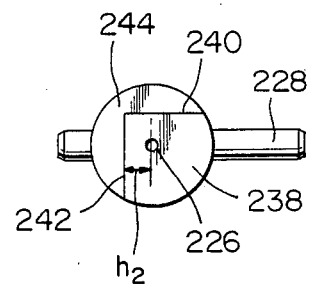
FIG. 16 is a bottom view of an electrode holder having machined flats.

In FIGS. 15 and 16, the electrode holder end 224 is shown having two ground flats 240 and 242 which extend perpendicular to each other and perpendicular to end face 238. Flats 240 and 242 are machined away from end 224 of the electrode holder. The flats 240 and 242 are each spaced from a center of the electrode at a distance h for flat 242, which is equal to one-half the cross-section of the electrode blank to be affixed to the electrode holder. The distance h varies for different size electrodes and, in FIG. 16, is shown for use with a symmetrical square or circular electrode.

It is contemplated as being within the scope of the invention that the electrode blank may be of a circular or rectangular configuration. Appropriate spacing of the machined flats from the center of the electrode holder is provided so as to align the center of the electrode with the center of the electrode holder. The alignment of the centers of the electrode blank and electrode holder is maintained by V-block 230, as will be described, for supercentering of the electrode with respect to the electrode holder.

The machined flats are ground away from the end 224 of the electrode holder for an axial length of approximately 1 inch so as to leave a stepped ledge 244 spaced axially from the end face 238 of the electrode holder. One of the two ground flats is aligned parallel, and the other of the ground flats is aligned perpendicular to a longitudinal axis of crosspin 228 to provide c axis alignment of the electrode blank when the crosspin 228 is positioned against an alignment device.

Figure 18:
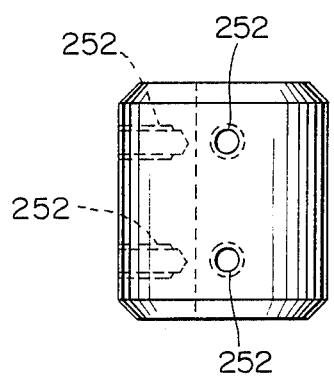
FIG. 18 is a side view of a V-block.
Figure 19:
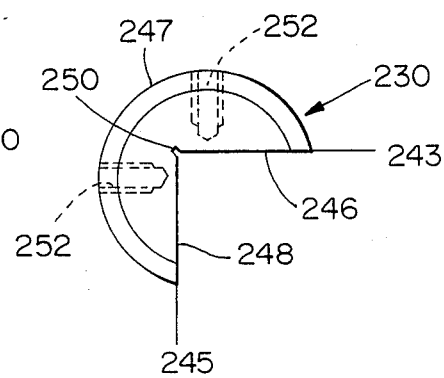
FIG. 19 is a top view of the V-block shown in FIG. 18.

The V-block 230, shown in FIGS. 18 and 19, is made of hardened tool steel. V-block 230 includes a cylindrical exterior surface 247, which terminates at points 243 and 245. Two flat perpendicular surfaces 246 and 248 extend along the entire height of the V-block. A recess 250 allows for clearance for a sharp corner of the electrode. In the V-block shown, there are a series of four radially extending threaded openings 252 for receipt of cap screws.

Figure 20:
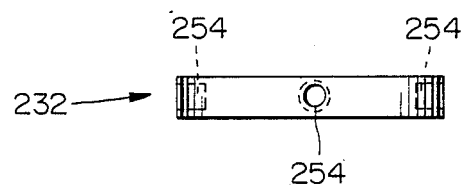
FIG. 20 is a side view of a clamping ring.
Figure 21:
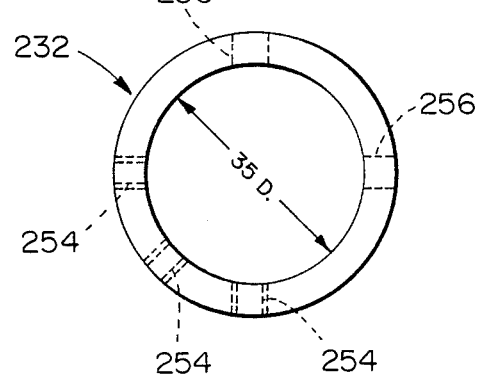
FIG. 21 is a top view of the clamping ring shown in FIG. 20.

The V-block is secure to the electrode holder by clamping ring 232, which is shown in FIGS. 20 and 21. Clamping ring 232 includes three radially extending threaded openings 254 and two radially extending unthreaded openings 256.

Figure 17:
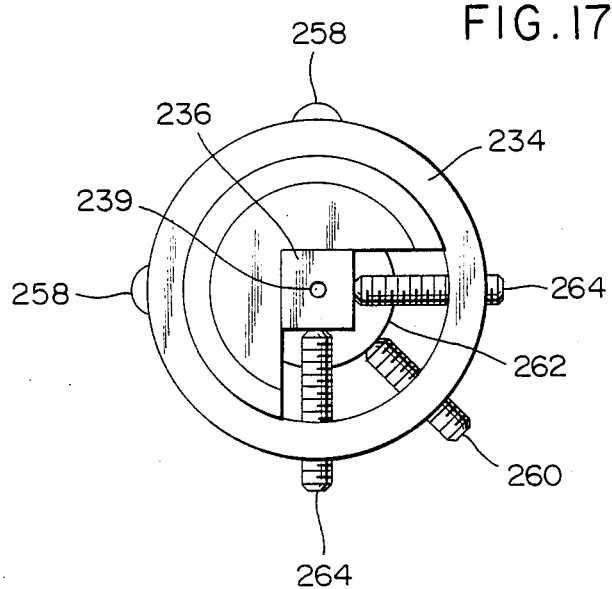
FIG. 17 is a top view of an electrode blank clamped within a V-block secured to an electrode holder.

As shown in FIG. 14, clamping ring 232 is secured to V-block 230 by cap screws 258, which extend through openings 256 into threaded holes 252. In addition, a set screw 260 extends through centrally located threaded opening 254 of clamping ring 232 and engages curved exterior surface 262 of the electrode holder. As shown in FIGS. 14 and 17, clamping ring 234 is also secured to V-block 230 by cap screws 258 extending through openings 256 and into threaded openings 252. Extending through clamping ring 234 are two set screws 264, located in the two outermost threaded openings 254 of clamping ring 234, which are aligned at a 90° angle. It is also possible to use a single set screw extending through the central threaded opening 254 of clamping ring 234 to engage a corner of the electrode blank 236 shown in FIG. 17. A single set screw extending through clamping ring 234 would preferably be used with a round electrode blank.

The flats are machined in the electrode holder at very low tolerances and at a specific distance from the center of the electrode. The V-block assembly tightly secures the electrode blank against the machined flats of the electrode holder. A nest is thereby formed for the electrode blank by the V-block, which supercenters an electrode blank with respect to the electrode holder.

The limitation of the electrode holder shown in FIG. 13 is its diameter. If an electrode blank is of a cross-sectional length or width which is greater than the diameter of the electrode holder, the electrode holder cannot be accommodated. However, if an electrode holder such as that shown in FIG. 7 is used, a much greater dimensioned electrode blank can be accommodated.

Having described the invention, many modifications thereto will become apparent to those skilled in the art to which it pertains without deviating from the spirit of the invention, as defined by the scope of the appended claims.

I claim:

1. A clamp assembly for an EDM electrode, said clamp assembly comprising:
    an elongated electrode holder having an end face and two flat surfaces extending from said end face perpendicular to each other and perpendicular to said end face,
    a block having two flat faces extending perpendicular to each other to form a V notch,
    first securing means for securing said flat faces of said block against said two flat surfaces of said electrode holder, and
    second securing means for securing an electrode against said two flat faces of said block and against said end face of said electrode holder,
    whereby precise positioning of the electrode is maintained relative to said electrode holder when replacing the electrode.

2. A clamp assembly for an EDM electrode according to claim 1, wherein said flat faces of said block and of said electrode holder have terminal ends and an exterior surface of said block between said terminal ends of said flat faces of said block is cylindrical and an exterior surface between said terminal ends of said flat surfaces of said electrode holder is cylindrical.

3. A clamp assembly for an electrode blank according to claim 2, wherein said first securing means is an annular clamping ring including means for engaging said cylindrical surface of said block.

4. A clamp assembly for an electrode blank according to claim 2, wherein said first securing means includes screws extending through said block and into contact with said electrode holder.

5. A clamp assembly for an electrode blank according to claim 2, wherein said second securing means is an annular clamping means for engaging said cylindrical exterior surface of said block.

6. A clamp assembly for an electrode blank according to claim 3, wherein said second securing means is an annular clamping means for engaging said cylindrical exterior surface of said block.

7. A clamp assembly as claimed in claim 1, wherein said two flat surfaces are spaced from the center of the end face a distance equal to one-half the cross-sectional distance of the electrode.

8. A clamp assembly for an EDM electrode having a height and a width, said clamp assembly comprising:
- an elongated eletrode holder having an end face and two flat surfaces extending from said end face perpendicular to each other and perpendicular to said end face, one of said two flat surfaces being spaced a distance from a center of said electrode holder equal to one-half of the width of the electrode and the other of said two flat surfaces being spaced a distance from said center of said electrode holder equal to one-half of the height of the electrode,
- a block having two flat faces extending perpendicular to each other to form a V notch,
- first securing means for securing said flat faces of said block against said two flat surfaces of said electrode holder, and
- second securing means for securing an electrode against said two flat faces of said block and against said end face of said electrode holder to align a center of the electrode with said center of said electrode holder.

9. A clamp assembly for an EDM electrode according to claim 8, wherein said flat faces of said block and of said electrode holder have terminal ends and an exterior surface of said block between said terminal ends of said flat faces of said block is cylindrical and an exterior surface between said terminal ends of said flat surfaces of said electrode holder is cylindrical.

10. A clamp assembly for an electrode blank according to claim 8, wherein said first securing means is an annular clamping ring including means for engaging said cylindrical surface of said block.

11. A clamp assembly for an electrode blank according to claim 9, wherein said first securing means includes screws extending through said block and into contact with said electrode holder.

12. A clamp assembly for an electrode blank according to claim 9, wherein said second securing means is an annular clamping means for engaging said cylindrical exterior surface of said block.

13. A clamp assembly for an electrode blank according to claim 10, wherein said second securing means is an annular clamping means for engaging said cylindrical exterior surface of said block.

14. A clamp assembly for a cylindrical EDM electrode, said clamp assembly comprising:
- an elongated electrode holder having an end face and two flat surfaces extending from said end face perpendicular to each other and perpendicular to said end face, said two flat surfaces being spaced a distance from a center of said electrode holder equal to the radius of the electrode,
- a block having two flat faces extending perpendicular to each other to form a V notch,
- first securing means for securing said flat faces of said block against said two flat surfaces of said electrode holder, and
- second securing means for securing an electrode against said two flat faces of said block and against said end face of said electrode holder to align a center of the eletrode with said center of said electrode holder.

15. A clamp assembly for an EDM electrode according to claim 14, wherein said flat faces of said block and of said electrode holder have terminal ends and an exterior surface of said block between said terminal ends of said flat faces of said block is cylindrical and an exterior surface between said terminal ends of said flat surfaces of said electrode holder is cylindrical.

16. A clamp assembly for an electrode blank according to claim 15, wherein said first securing means is an annular clamping ring including means for engaging said cylindrical surface of said block.

17. A clamp assembly for an electrode blank according to claim 15, wherein said first securing means includes screws extending through said block and into contact with said electrode holder.

18. A clamp assembly for an electrode blank according to claim 15, wherein said second securing means is an annular clamping means for engaging said cylindrical exterior surface of said block.

19. A clamp assembly for an electrode blank according to claim 16, wherein said second securing means is an annular clamping means for engaging said cylindrical exterior surface of said block.

20. A method of mounting an elongated electrode to an electrode holder such that the center axes of the electrode and electrode holder are aligned, the method comprising the steps of:
- (a) determining the cross-sectional height and width of the electrode at the region where the electrode is to be mounted to the electrode holder;
- (b) forming two perpendicular flats on the electrode holder at a location spaced from the center of the electrode holder equal to one-half of the determined height and width of the electrode;
- (c) attaching a V-block having two perpendicular flat faces to the electrode holder such that the V-block flat faces mate with the two perpendicular flats of the electrode holder to form a nest for receiving the electrode; and
- (d) securing the electrode to the electrode holder in the nest formed by the V-block such that the center axes of the electrode and electrode holder are aligned.

* * * * *